United States Patent [19]

Rosinski

[11] Patent Number: 4,678,766
[45] Date of Patent: Jul. 7, 1987

[54] ENHANCEMENT OF SHAPE SELECTIVITY OF ZEOLITES

[75] Inventor: Edward J. Rosinski, Pedricktown, N.J.

[73] Assignee: Mobil Oil Corporation, New York, N.Y.

[21] Appl. No.: 704,694

[22] Filed: Feb. 22, 1985

Related U.S. Application Data

[63] Continuation-in-part of Ser. No. 543,549, Oct. 19, 1983, abandoned, which is a continuation of Ser. No. 543,547, Oct. 19, 1983, abandoned, which is a continuation-in-part of Ser. No. 355,420, Mar. 8, 1982, abandoned.

[51] Int. Cl.$^4$ .............................................. B01J 29/38
[52] U.S. Cl. ........................................ 502/85; 502/85; 502/77; 423/328; 208/120
[58] Field of Search ................... 423/328; 502/71, 77, 502/85, 86, 224; 208/120

[56] References Cited

U.S. PATENT DOCUMENTS

| | | |
|---|---|---|
| 3,594,331 | 7/1971 | Elliott ................................... 502/60 |
| 3,700,585 | 10/1972 | Chen et al. .......................... 208/111 |
| 3,702,886 | 11/1972 | Argauer et al. ..................... 423/328 |
| 3,933,983 | 1/1976 | Elliott ................................. 423/328 |
| 4,073,865 | 2/1978 | Flanigen et al. .................... 423/339 |
| 4,297,335 | 10/1981 | Lok et al. ............................. 423/328 |
| 4,324,698 | 4/1982 | Lewis et al. ..................... 208/115 X |
| 4,361,713 | 11/1982 | Kaeding .............................. 585/467 |
| 4,414,189 | 11/1983 | Kokotailo et al. .................. 423/328 |
| 4,427,786 | 1/1984 | Miale et al. ........................... 502/61 |
| 4,427,787 | 1/1984 | Miale et al. ........................... 502/77 |
| 4,427,788 | 1/1984 | Miale et al. ..................... 423/328 T |
| 4,427,791 | 1/1984 | Miale et al. ......................... 502/203 |
| 4,444,738 | 4/1984 | Susuki et al. ......................... 502/69 |
| 4,444,902 | 4/1984 | Chang et al. ......................... 502/86 |
| 4,520,219 | 5/1985 | Sato ..................................... 585/463 |
| 4,548,913 | 10/1985 | Schwerdtel et al. ................ 502/68 |
| 4,567,310 | 1/1986 | Rodewald ............................ 502/61 |

Primary Examiner—John Doll
Assistant Examiner—Jackson Leeds
Attorney, Agent, or Firm—A. J. McKillop; M. G. Gilman; L. P. Hobbes

[57] ABSTRACT

A method is provided for enhancing the shape selectivity of a crystalline zeolite having a silica-to-alumina mol ratio greater than 10. The method consists of treating the zeolite with an ammonium fluoride solution at moderately elevated temperature, in the absence or in the presence of a matrix. The products are useful as shape-selective sorbents, and also as shape-selective catalysts for organic reactions including catalytic dewaxing.

25 Claims, No Drawings

ENHANCEMENT OF SHAPE SELECTIVITY OF ZEOLITES

This application is a continuation-in-part of application Ser. No. 543,549, filed Oct. 19, 1983, now abandoned, and a continuation of application Ser. No. 543,547, filed Oct. 19, 1983, now abandoned, which in turn is a continuation-in-part of application Ser. No. 355,420 filed Mar. 8, 1982, now abandoned, all of which are incorporated herein by reference.

BACKGROUND OF THE INVENTION

1. Field of the Invention

This invention relates to a method for enhancing the selective acid activity of a porous crystalline aluminosilicate zeolite, including high silica-containing porous crystalline zeolite materials, which involves the steps of contacting the crystalline material with an ammonium fluoride solution, treating the resulting material with an aqueous solution of an ammonium salt, and calcining the ammonium salt solution contacted material. The resulting zeolite composition exhibits enhanced shape selectivity.

2. Description of Prior Art

Zeolitic materials, both natural and synthetic, have been demonstrated in the past to have catalytic properties for various types of hydrocarbon conversions. Certain zeolitic materials are ordered, porous crystalline aluminosilicates having a definite crystalline structure within which there are a large number of smaller cavities which may be interconnected by a number of still smaller channels. Since the dimensions of these pores are such as to accept for adsorption molecules of certain dimensions while rejecting those of large dimensions, these materials have come to be known as "molecular sieves" and are utilized in a variety of ways to take advantage of these properties.

Such molecular sieves, both natural and synthetic, include a wide variety of positive ion-containing crystalline aluminosilicates. These aluminosilicates can be described as a rigid three-dimensional framework $SiO_4$ and $AlO_4$ in which the tetrahedra are cross-linked by the sharing of oxygen atoms whereby the ratio of the total aluminum and silicon atoms to oxygen is 1:2. The electrovalence of the tetrahedra containing aluminum is balanced by the inclusion in the crystal of a cation, for example, an alkali metal or an alkaline earth metal cation. This can be expressed wherein the ratio of aluminum to the number of various cations, such as $Ca/2$, $Sr/2$, Na, K or Li is equal to unity. One type of cation may be exchanged either entirely or partially by another type of cation utilizing ion exchange techniques in a conventional manner. By means of such cation exchange, it has been possible to vary the properties of a given aluminosilicate by suitable selection of the cation. The spaces between the tetrahedra are occupied by molecules of water prior to dehydration.

Prior art techniques have resulted in the formation of a great variety of synthetic aluminosilicates. These aluminosilicates have come to be designated convenient symbols, as illustrated by zeolite ZSM-5 (U.S. Pat. No. 3,702,886).

High silica-containing zeolites are well known in the art and it is generally accepted that the ion exchange capacity of the crystalline zeolite is directly dependent on its aluminum content. Thus, for example, the more aluminum there is in a crystalline structure, the more cations are required to balance the electronegativity thereof, and when such cations are of the acidic type such as hydrogen, they impart tremendous catalytic activity to the crystalline material. On the other hand, high silica-containing zeolites having little or substantially no aluminum, have many important properties and characteristics and a high degree of structural stability such that they have become candidates for use in various processes including catalytic processes. Materials of this type are known in the art and include high silica-containing aluminosilicates such as ZSM-5, ZSM-11 (U.S. Pat. No. 3,709,979), and ZSM-12 (U.S. Pat. No. 3,832,449) to mention a few.

The silica-to-alumina ratio of a given zeolite is often variable; for example, zeolite X (U.S. Pat. No. 2,882,244) can be synthesized with a silica-to-alumina ratio of from 2 to 3; zeolite Y (U.S. Pat. No. 3,130,007) from 3 to about 6. In some zeolites, the upper limit of silica-to-alumina ratio is virtually unbounded. Zeolite ZSM-5 is one such material wherein the silica-to-alumina ratio is at least 5. U.S. Pat. No. 3,941,871 discloses a crystalline metal organo silicate essentially free of aluminum and exhibiting an x-ray diffraction pattern characteristic of ZSM-5 type aluminosilicate. U.S. Pat. Nos. 4,061,724; 4,073,865 and 4,104,294 describe microporous crystalline silicas or organo silicates wherein the aluminum content present is at impurity levels.

Because of the extremely low aluminum content of these high silica-containing zeolites, their ion exchange capacity is not as great as materials with a higher aluminum content. Therefore, when these materials are contacted with an acidic solution and thereafter are processed in a conventional manner, they are not as catalytically active as their higher aluminum-containing counterparts.

The novel process of this invention permits the preparation of certain high silica-containing materials which have all the desirable properties inherently possessed by such high silica materials and, yet, which have a high rejection activity for larger molecules, i.e., cyclohexane over normal hexane thus imparting a greater degree of shape selectivity to the zeolite catalyst. In addition if catalysts of reduced activity are desired, then calcination in the presence of controlled amounts of $NH_4F$ leads to catalysts having adjusted activity required for some applications.

It is noted that U.S. Pat. Nos. 3,354,078 and 3,644,220 relate to treating crystalline aluminosilicates with volatile metal halides. Neither of these latter patents is, however, concerned with treatment of crystalline materials having a high silica-to-alumina mole ratio or with treatment of any crystalline zeolite with ammonium fluorides in the present manner.

SUMMARY OF THE INVENTION

The present invention relates to a novel process for improving the shape selectivity of crystalline aluminosilicate zeolites, including high silica-containing crystalline zeolites, which comprises the steps of contacting the crystalline zeolite material with an ammonium fluoride solution, and if the zeolite material is a sodium zeolite material contacting the treated material with a warm aqueous solution of an ammonium salt (e.g. $NH_4Cl$ or $NH_4NO_3$), followed by calcining the treated zeolite material. The resulting zeolite material exhibits enhanced selectivity in the catalysis of numerous chemical reactions, such as, for example, cracking of hydrocarbons, e.g.

DESCRIPTION OF SPECIFIC EMBODIMENTS

The novel process of this invention is concerned with the treatment of crystalline zeolites, including high silica-containing crystalline material. The expression "high silica-containing crystalline material" is intended to define a crystalline structure which has a silica-to-alumina ratio greater than 100 and more preferably greater than 500, up to and including those highly siliceous materials where the silica-to-alumina ratio is infinity or as reasonably close to infinity as practically possible. This latter group of highly siliceous materials is exemplified by U.S. Pat. Nos. 3,941,871; 4,061,724; 4,073,856 and 4,104,294 wherein the materials are prepared from reaction solutions which involve no deliberate addition of aluminum. However, trace quantities of aluminum are usually present due to the impurity of the reaction solutions. It is to be understood that the expression "high silica-containing crystalline material" also specifically includes those materials which have other metals besides silica and/or alumina associated therewith, such as boron, iron, chromium, etc. Thus, the starting materials utilized in the novel process of this invention may have a silica-to-alumina ratio greater than about 10 (irrespective of what other materials or metals are present in the crystal structure).

The novel process of this invention is simple and easy to carry out. Ordinarily it will be desirable first to calcine the high silica zeolite for about 10 hours at 1000° F. in air or other oxygen-containing gas. This step may be omitted in the absence of occluded organic matter. The crystalline zeolite is then contacted, i.e. by impregnation, with an ammonium fluoride solution, the impregnation being conducted at a temperature of from about 0° C. to about 100° C., preferably from about 82° C. to about 110° C. The contacted zeolite optionally is then water washed and is then calcined at a temperature of 300° C. to 900° C. If the zeolite originally was a sodium zeolite, it may be then ion exchanged with an aqueous solution of ammonium chloride and calcined again at a temperature of 300° C. to 900° C. A solution providing at least 0.01 gram of fluorine per 1 gram of zeolite is preferred and a contacting temperature of 80° C. to 150° C. for the impregnating and reacting steps, and a contact time of 4 to 24 hours. It is desirable to select the aqueous fluoride and ammonium salt solution so that the final treated zeolite product will have a fluoride concentration of the equivalent of between about 0.1 and about 30 percent by weight of fluorine.

Of the high silica zeolite materials advantageously treated in accordance herewith, zeolites ZSM-5, ZSM-11, ZSM-12, ZSM-23, ZSM-35, ZSM-38 and ZSM-48 are particularly noted. ZSM-5 is described in U.S. Pat. No. 3,702,886 and Re 29,948, the entire contents of each being hereby incorporated by reference herein. ZSM-11 is described in U.S. Pat. No. 3,709,979, the teaching of which is incorporated herein by reference. ZSM-12 is described in U.S. Pat. No. 3,832,449, the contents of which are incorporated herein by reference. ZSM-23 is described in U.S. Pat. No. 4,076,842, the teaching of which is incorporated herein by reference. The contents of U.S. Pat. Nos. 4,016,245 and 4,046,859, describing ZSM-35 and ZSM-38, respectively, are incorporated herein by reference. ZSM-48 is more particularly described in pending U.S. application Ser. No. 303,276 filed Sept. 17, 1981 and a pending application filed Nov. 18, 1981, serial number unknown at this date, which is a continuation of application Ser. No. 064,703 filed Aug. 8, 1979 the entire contents of which are incorporated herein by reference.

ZSM-48 can be identified, in terms of moles of anhydrous oxides per 100 moles of silica as follows: (0.05 to 5)$N_2O$: (0.1 to 10)$M_{2/n}O$: (0 to 4) $Al_2O_3$: (100) $SiO_2$ wherein M is at least one cation having a valence n, N is a mixture of a $C_2$–$C_{12}$, and more preferably of a $C_3$–$C_5$, alkylamine and a tetramethylammonium compound and wherein the composition is characterized by the distinctive X-ray diffraction pattern as shown below:

| Characteristics Lines of Zeolite ZSM-48 | |
|---|---|
| d (A) | Relative Intensity (I/Io) |
| 11.8 ± 0.2 | S |
| 10.2 ± 0.2 | W-M |
| 7.2 ± 0.15 | W |
| 4.2 ± 0.08 | VS |
| 3.9 ± 0.08 | VS |
| 3.6 ± 0.06 | W |
| 3.1 ± 0.05 | W |
| 2.85 ± 0.05 | W |

These values were determined by standard techniques. The radiation was the K-alpha doublet of copper, and a diffractometer equipped with a scintillation counter and a strip chart pen recorder was used. The peak heights, I, and the positions as a function of two times theta, where theta is the Bragg angle, were read from the spectrometer chart. From these, the relative intensities, 100 $I/I_o$, where $I_o$ is the intensity of the strongest line or peak, and d (obs.), the interplanar spacing in Angstroms (A) corresponding to the recorded lines, were calculated. In the foregoing table the relative intensities are given in terms of the symbols W=weak, VS=very strong, M=medium and W-M=weak-to-medium (depending on the cationic form). Ion exchange of the sodium ion with cations reveals substantially the same pattern with some minor shifts in interplanar spacing and variation in relative intensity. Other minor variations can occur depending on the silicon to aluminum ratio of the particular sample, as well as if it has been subjected to thermal treatment.

ZSM-48 can be prepared from a reaction mixture containing a source of silica, tetramethylammonium compound, $C_2$–$C_{12}$ alkylamine, an alkali metal oxide, e.g. sodium, with or without a source of alumina, and water, and having a composition, in terms of mole ratios of oxides, falling within the following ranges:

| REACTANTS | BROAD | PREFERRED |
|---|---|---|
| $Al_2O_3/SiO_2$ | 0 to 0.08 | 0 to 0.02 |
| $Na_2O/SiO_2$ | 0.01 to 1.0 | 0.1 to 0.5 |
| $N_2O/SiO_2$ | 0.005 to 0.5 | 0.005 to 0.25 |
| $OH^-/SiO_2$ | 0.01 to 0.5 | 0.05 to 0.2 |
| $H_2O/SiO_2$ | 10 to 200 | 20 to 100 | wherein N is a mixture of a $C_2$–$C_{12}$ alkylamine and tetramethylammonium compound, and maintaining the mixture at 80°–200° C. until crystals of ZSM-48 are formed.

The molar ratio of $C_2$–$C_{12}$ alkylamine to tetramethyl ammonium compound is not narrowly critical and can range from 1:1 to 10:1. The tetramethylammonium compound can include the hydroxide or halide with the chloride being particularly preferred.

The silica/alumina mole ratio of ZSM-48 can be as low as 12 and extend to an infinite number.

The original cations of ZSM-48 can be replaced, at least in part, by calcination and/or ion exchange with another cation. Thus, the original cations are exchanged into a hydrogen or hydrogen ion precursor form or a form in which the original cation has been replaced by a metal of Groups II through VIII of the Periodic Table. Thus, for example, it is contemplated that the original cations can be replaced with ammonium ions or with hydronium ions. Catalytically active forms of these would include, in particular, hydrogen, rare earth metals, aluminum, metals of Groups II and VIII of the Periodic Table and manganese and combinations of metal and hydrogen.

The selectivity enhanced materials prepared by the present process are useful as catalyst components for selective modification of straight chain components in cracking and polymerization reactions.

In practicing a particularly desired chemical conversion process, it may be useful to incorporate the above-described activity enhanced material with a matrix comprising a material resistant to the temperature and other conditions employed in the process. Such matrix material is useful as a binder and imparts reistance to the catalyst for the severe temperature, pressure and reactant feed stream velocity conditions encountered in many cracking processes.

Useful matrix materials include both synthetic and naturally occurring substances, as well as inorganic materials such as clay, silica and/or metal oxides. The latter may be either naturally occurring or in the form of gelatinous precipitates or gels including mixtures of silica and metal oxides. Naturally occurring clays which can be composited with the zeolite include those of the montmorillonite and kaolin families, which families include the sub-bentonites and the kaolins commonly known as Dixie, McNamee, Georgia and Florida clays or others in which the main mineral constituent is halloysite, kaolinite, dickite, nacrite or anauxite. Such clays can be used in the raw state as originally mined or initially subjected to calcination, acid treatment or chemical modification.

In addition to the foregoing matrix materials, the catalyst employed herein may be composited with a porous matrix material such as alumina, silica-alumina, silica-magnesia, silica-zirconia, silica-thoria, silica-beryllia, and silica-titania, as well as ternary compositions, such as silica-alumina-thoria, silica-alumina-zirconia, silica-alumina-magnesia and silica-magnesia-zirconia. The matrix may be in the form of a cogel. The relative proportions of activity enhanced zeolite component and matrix, on an anhydrous basis, may vary widely with the activated zeolite content ranging from about 1 to about 99 percent by weight and more usually in the range of about 5 to about 80 percent by weight of the total dry composite.

In some instances it may be desirable to incorporate the untreated zeolite into a composite with one of the above described matrix materials before treating it with ammonium fluoride and ammonium chloride solutions.

The term "shape selective", as used herein, defines a property of the crystalline zeolites which derives from their regular structure consisting of pores and ore windows of precise size. Molecules having a larger critical diameter than the particular precise size of a zeolite can be neither sorbed nor desorbed from the channels of that zeolite. *Slightly* smaller molecules, however, are absorbed very slowly (retarded), while molecules of even smaller critical diameter are absorbed rapidly. This shape selective property permits the zeolites to be used as shape selective sorbents for the separation of molecules of different size, and as shape-selective catalysts.

U.S. Pat. No. 3,140,322 issued to Frilette et al is one of many patents on shape-selective catalysis, and illustrates shape selective catalysis with small pore and large pore zeolites. This patent is incorporated herein by reference for background purposes.

That the term shape-selective catalysis is a recognized term of art is illustrated by Chapter 12, pages 680–713, in *Zeolite Chemistry and Catalysis*, Jule E. Rabo, ACS Monograph No. 171, published by American Chemical Society, (1976). Chapter 12 is incorporated herein by reference for background.

The present invention provides for enhancement of shape selectivity of a particular zeolite. The term "enhancement", as used herein, means an alteration of the effective pore size of the zeolite which increases its sorption capacity for normal hexane relative to cyclohexane, the cyclohexane being the molecule of larger critical diameter compared to normal hexane. Such an enhancement implies that the zeolite pores are made effectively smaller by the method of this invention.

EXAMPLES

In the following examples, fluoride treated zeolite samples were prepared by first calcining a high silica zeolite for 10 hours at about 540° C. in air and then contacting it with an ammonium fluoride solution. Sufficient amount of water was used to dissolve the salt and to fill the pores of the zeolite. Depending on the amount of salt needed the ratio of grams of water per gram of zeolite varied from 0.5 to about 2. The salt solution was contacted with the air calcined powder in covered vessels for 4 to 24 hours at 82° C.–110° C. (180°–230° F.). The treated samples then were in some cases dried directly at 110° C. (230° F.) and then recalcined at about 540° C. (1000° F.) prior to the determination of physical and catalytic properties. Most of the samples were water washed after the NH$_4$F treatment prior to drying at 110° C. (230° F.) and were calcined at about 540° C. (1000° F.). The NH$_4$F treated sodium zeolites were also treated with NH$_4$Cl to exchange the residual Na$^+$ with NH$_4^+$ ions. The samples then were water washed free of soluble salts and air calcined for 10 hours at about 540° C. (1000° F.). The specific treatments used with each example is given in each of the following Tables.

The sorption data used to determine shape selectivity changes were obtained as follows:

A weighed sample of the calcined zeolite was contacted with the desired pure absorbate vapor in an adsorptive changer, evacuated to 12 mm of mercury pressure when checking capacity for water and 20 mm of mercury when checking capacity for cyclohexane and n-hexane, pressure less than the vapor-liquid equilibrium pressures of the respective adsorbate at room temperature. The pressure was kept constant (within about ±0.5 mm Hg) by addition of adsorbate vapor controlled by a monostat during the adsorption period which did not exceed about 8 hours. As the adsorbate was adsorbed by the zeolite, the decrease in pressure caused the manostat to open a valve which admitted more adsorbate vapor to the chamber to restore the above control pressures. Sorption was completed when the pressure change was not sufficient to activate the manostat. The increase in weight was calculated as the adsorption capacity of the sample.

The shape selectivity determinations in the examples were calculated as the ratio of wt % n-hexane capacity divided by the wt % cyclohexane adsorbed. This ratio is used in discussing changes in the shape selective character of the treated zeolite exemplified and of the untreated starting material.

Also in the following examples, zeolite catalytic activity is measured by means of Alpha Values. As is known in the art, the Alpha Value is an approximate indication of the catalytic cracking activity of the catalyst compared to a standard catalyst, and is given as a relative rate constant (rate of normal hexane conversion per volume of catalyst per unit time). Alpha Value is based on the activity of the highly active silica-alumina cracking catalyst taken as an Alpha of 1. The Alpha Test is described in U.S. Pat. No. 3,354,078 and in The Journal of Catalysis, Vol. IV, pp. 522–529 (August 1965), which are incorporated herein by reference.

EXAMPLES 1-6

In Examples 1-6 (Table 1) samples of a large crystal (2-5$\mu$) ZSM-5 zeolite were calcined at a temperature of about 540° C. (1000° F.) for a period of 10 hours in air. Each of the cooled calcined samples except samples 1 and 5 were then saturated (all pores were filled) with an aqueous solution of ammonium fluoride held for a period of 24 hours at 88° C.–93° C. (190°–200° F.). Each of the saturated samples was then contacted with water, dried at 110° C. (230° F.) and calcined for 10 hours at a temperature of about 540° C. (1000° F.) in air. The properties of the samples thus treated are reported in Table 1. Samples 2 and 3 subsequently were contacted with an aqueous solution of ammonium chloride, water washed, dried and calcined. The properties of these materials are also reported in Table 1.

Table 2 reports test runs 7 and 8 in which similar runs as in Table 1 were conducted on ZSM-5 zeolite of a smaller crystal size (0.02–0.05$\mu$). Tables 3 and 4 demonstrate the effect on the zeolite of varying the ammonium fluoride concentration. In Table 3 the concentration of ammonium fluoride in the treatment of the process was 5, 10, and 20 wt % corresponding to Examples 9, 10 and 11 and in Table 4; 2, 4 and 6 wt % corresponding to Examples 12, 13 and 14. In Table 5, the effect of varying ammonium fluoride concentrations in treating a low sodium ZSM-5 catalyst is shown. The examples shown in Table 6 demonstrate the need for precalcination in air prior to the ammonium fluoride treatment. Examples 19, 20 and 21 were precalcined in nitrogen prior to the ammonium fluoride treatment and show that the catalyst is not affected by the ammonium fluoride treatment. This is shown by the shape selectivity-adsorption ratio of n-hexane over the cyclohexane which did not change, remaining about 2, even with the addition of as much as 10% F as ammonium fluoride. Examples 25, 26 and 27 show that water washing after the ammonium fluoride treatment and prior to calcination is beneficial for retaining the initial alpha activity. Here the alpha values after the ammonium fluoride treatment and subsequent exchange with ammonium chloride to reduce the residual sodium were 296, 284 and 279 for the catalyst treatement with 2, 5, 10 wt %F, respectively. Examples 22, 23 and 24 which were not water washed prior to calcination had alpha values of 106, 17 and 4 for the samples treated with 1, 5, 10 wt %F as ammonium fluoride. presence of fluoride during the calcination at about 540° C. (1000° F.) reduces catalytic alpha activity. In some applications this is used advantageously.

The data presented in Table 7 demonstrate that alpha activity can be controlled in a ZSM-5 catalyst through the selection of the proper amount of ammonium fluoride treatment. In preparing these examples the sodium form of large crystal ZSM-5 was treated with 0.5, 1.0 and 2 wt % fluorine as ammonium fluoride, was water washed, dried at 110° C. (230° F.) and then calcined at about 540° C. (1000° F.) prior to being evaluated as a catalyst. It is apparent from the shape selectivity ratio that the adsorption capacity was altered, increasing the ratio from 3-3.3 to 4.55. After the initial ammonium fluoride exchange, the 4.55 value was reduced to 3.7. However it is apparent that treatment with at least 1% fluoride on catalyst basis is needed to affect the alpha activity which can be reduced from 580 to 452 and 222 within the 1 and 2 wt %F treatment, thus demonstrating the approach to controlled or optimized catalyst activity.

The examples presented in Table 8 serve to demonstrate that the ammonium fluoride treatment can be applied to a composited catalyst such as an extrudate containing 65% ammonium ZSM-5 and 35 wt % alumina binder. The extruded catalyst was prepared by dry mixing the powdered ZSM-5 and powdered alpha aluminum monohydrate, adding sufficient water to make a plastic mass and then extruding the mass through a die containing the desired size holes. From the results presented in Table 8 it can be seen that the treated examples 32 and 33 do have increased selectivity factors as measured by the ratio of n-hexane adsorption over cyclohexane. In these examples the ratios were 3.3 and 3.5 which should be compared to 2.2 for the starting calcined extrudate.

The data shown in Table 9, for examples 34, 35 and 36 shows that the ammonium fluoride treatment can be used to modify both sodium and ammonium forms of ZSM-35 zeolite. In preparing example 35, the sodium form of ZSM-35 was treated with 5 wt % fluoride as an aqueous solution of ammonium fluoride. This treatment resulted in the increase in the selectivity ratio of 1.9 to 2.5. In a similar manner, a 2 wt % treatment of an ammonium ZSM-35 zeolite increased the selectivity factor to 3.2. These treatments do not appear to be detrimental to the ZSM-35 as measured by either surface area of crystallinity.

Examples 37, 38 and 39 in Table 10 serve to demonstrte that the ammonium fluoride treatment at the 5 and 10 wt % level of fluoride can be applied to ZSM-38. Here the selectivity ratio of n-hexane over cyclohexane adsorption increased from 1.6 to 1.9 and 2.5 for the treated ZSM-38.

It is to be understood that the ammonium fluoride treatment of this invention can be applied to other zeolites such as mordenite, offretite, ZSM-34, ZSM-21, ZSM-12, beta and alpha zeolites.

Use of this invention enables precise control over the shape selectivity of various pore zeolites. This is particularly desirable since it permits adjusting a catalyst to its optimum performance in a particular process.

It is observed from the above results that the present method is also highly useful for adjusting acid catalytic activity of crystalline zeolites, including those having a silica-to-alumina mole ratio greater than 8, which have, in turn, been impregnated with an ammonium fluoride solution, contacted with a warm aqueous solution of an ammonium salt, and calcined.

TABLE 1

NH₄F TREATMENT OF VARIOUS FORMS OF ZSM-5
(2-5 Micron Crystal Size)

| EXAMPLE NO. | 1 | 2 | 3 | 4 | 5 | 6 |
|---|---|---|---|---|---|---|
| Zeolite | | | | | | |
| Type | ZSM-5 | ZSM-5 | ZSM-5 | ZSM-5 | ZSM-5 | ZSM-5 |
| Form | Na | Na | Na | NH₄ | Low Na | Low Na |
| Pretreatment | | | | | | |
| Time, Hrs. | 10 | 10 | 10 | 10 | 10 | 10 |
| Temp, °C. | 540 | 540 | 540 | 540 | 540 | 540 |
| Atmosphere | Air | Air | Air | Air | Air | Air |
| NH₄F Treatment | | | | | | |
| Wt % F | 0 | 5 | 6 | 6 | 0 | 5 |
| Solution | — | Aqueous | Aqueous | Aqueous | — | Aqueous |
| Status | — | Pores Filled | Pores Filled | Pores Filled | — | Pores Filled |
| Time, Hrs. | — | 24 | 24 | 24 | — | 24 |
| Temp, °C. | — | 88–93 | 88–93 | 88–93 | — | 88–93 |
| Processing | | | | | | |
| Wash | — | Water | Water | Water | — | Water |
| Dry | — | 110° C. | 110° C. | 110° C. | — | 110° C. |
| Calcine | | | | | | |
| Time, Hrs. | — | 10 | 10 | 10 | — | 10 |
| Temp, °C. | — | 540 | 540 | 540 | — | 540 |
| Atmosphere | — | Air | Air | Air | — | Air |
| Properties | | | | | | |
| Surf. Area m²/g | 355 | 386 | 307 | 348 | — | 356 | 369 | 328 |
| Sorption Wt % | | | | | | |
| H₂O | 10.2 | 7.6 | 1.6 | 1.1 | — | 8.3 | 5.7 | 1.3 |
| Cyclohexane | 3.6 | 4.2 | 1.5 | 1.1 | 2.4 | 4.0 | 4.8 | 2.7 |
| n-hexane | 11.9 | 12.8 | 10.4 | 11.4 | 10.7 | 11.9 | 12.1 | 11.1 |
| NC₆/cyC₆ ratio | 3.31 | 3.0 | 6.9 | 10.4 | 4.5 | 3.0 | 2.5 | 4.1 |
| x-ray % ZSM-5 | 100 | 50 | — | — | 80 | 85 | 40 |

Properties: After NH₄Cl exchange, Dried Sample, Water Wash, Dried and Calcined at 540° C. for 10 hours

| | | | | | | |
|---|---|---|---|---|---|---|
| Surf. Area m²/g | — | 356 | 348 | — | — | — |
| Sorption Wt % | | | | | | |
| H₂O | — | 4.4 | 4.0 | — | — | 4.7 |
| cyclohexane | — | 2.6 | 2.4 | — | — | 4.0 |
| n-hexane | — | 11.4 | 12.1 | — | — | 11.6 |
| NC₆cyC₆ ratio | — | 4.38 | 5.0 | — | — | 2.9 |
| alpha | 583 | 393 | 173 | — | — | 210 |
| x-ray % ZSM-5 | — | — | 75 | — | — | 60 |

TABLE 2

NH₄F TREATMENT OF VARIOUS FORMS OF ZSM-5
(Crystal Size = 0.02–0.05µ)

| EXAMPLE NO. | 7 | 8 |
|---|---|---|
| Zeolite | | |
| Type | ZSM-5 | ZSM-5 |
| Form | Na | Na |
| Pretreatment | | |
| Time, Hrs. | — | 10 |
| Temp, °C. | — | 540 |
| Atmosphere | — | Air |
| NH₄F Treatment | | |
| Wt % F | — | 5 |
| Solution | — | Aqueous |
| Status | — | Pores Filled |
| Time, Hrs. | — | 24 |
| Temp, °C. | — | 88–93 |
| Processing | | |
| Wash | — | Water |
| Dry | — | 110° C. |
| Calcine | | |
| Time, Hrs. | — | 10 |
| Temp, °C. | — | 540 |
| Atmosphere | — | Air |
| Properties | | |
| Surf. Area m²/g | — | — |
| Sorption Wt % | | |
| H₂O | 5.3 | 2.8 |
| Cyclohexane | 5.3 | 5.0 |
| n-hexane | 10.5 | 10.5 |
| NC₆/cyC₆ ratio | 1.98 | 2.1 |
| x-ray % ZSM-5 | 100 | 70 |

Properties: After NH₄Cl exchange, Dried Sample, Water Wash, Dried and Calcined at 540° C. for 10 hours

| | | |
|---|---|---|
| Surf. Area m²/g | — | 324 |
| Sorption Wt % | | |
| H₂O | — | 3.2 |
| cyclohexane | — | 4.6 |
| n-hexane | — | 10.0 |
| NC₆cyC₆ ratio | — | 2.2 |
| alpha | — | 284 |

TABLE 3

EFFECT OF VARYING NH₄F CONCENTRATIONS ON THE ZEOLITES

| EXAMPLE NO. | 1 | 9 | 10 | 11 |
|---|---|---|---|---|
| Zeolite | | | | |
| Type | ZSM-5 | ZSM-5 | ZSM-5 | ZSM-5 |
| Form | Na | Na | Na | NH₄ |
| Crystal Size | 2–5 | 2–5 | 2–5 | 2–5 |

TABLE 3-continued
EFFECT OF VARYING NH4F CONCENTRATIONS ON THE ZEOLITES

| EXAMPLE NO. | 1 | 9 | 10 | 11 |
|---|---|---|---|---|
| ($\mu$) | | | | |
| Pretreatment | | | | |
| Time, Hrs. | 10 | 10 | 10 | 10 |
| Temp, °C. | 540 | 540 | 540 | 540 |
| Atmosphere | Air | Air | Air | Air |
| NH4F Treatment | | | | |
| Wt % F | 0 | 5 | 10 | 20 |
| Solution | — | Aqueous | Aqueous | Aqueous |
| Status | — | Pores Filled | Pores Filled | Pores Filled |
| Time, Hrs. | — | 24 | 24 | 24 |
| Temp, °C. | — | 88–93 | 88–93 | 88–93 |
| Processing | | | | |
| Wash | — | Water | Water | Water |
| Dry | — | 110° C. | 110° C. | 110° C. |
| Calcine | | | | |
| Time, Hrs. | — | 10 | 10 | 10 |
| Temp, °C. | — | 540 | 540 | 540 |
| Atmosphere | — | Air | Air | Air |
| Properties | | | | |
| Surf. Area m$^2$/g | 355 | 386 | 307 | 279 |
| Sorption Wt % | | | | |
| H$_2$O | 10.2 | 7.6 | 1.6 | 0.7 |
| Cyclohexane | 3.6 | 4.2 | 1.5 | 0.9 |
| n-hexane | 11.9 | 12.8 | 10.4 | 9.9 |
| NC$_6$/cyC$_6$ ratio | 3.31 | 3.0 | 6.9 | 11.0 |
| x-ray % | 100 | 50[1] | 60[2] | 55[3] |

Properties: After NH4Cl exchange, Dried Sample, Water Wash, Dried and Calcined at 540° C. for 10 hours

| | | | | |
|---|---|---|---|---|
| Surf. Area m$^2$/g | — | 356 | 356 | |
| Sorption Wt % | | | | |
| H$_2$O | — | 4.4 | 4.7 | 5.2 |
| cyclohexane | — | 2.6 | 2.4 | 2.1 |
| n-hexane | — | 11.4 | 11.3 | 11.0 |
| NC$_6$cyC$_6$ ratio | — | 4.4 | 4.7 | 5.2 |
| alpha | 583 | 393 | 259 | 370 |

[1] [2] [3] X-ray data show apparent interaction of NH4F with the ZSM-5 as evidenced by doublets at:

| | | |
|---|---|---|
| 24.5[1] | 24.6[2] | 24.6[3] |
| 25.1 | 25.1 | 27.0 |
| | 26.4 | 29.3 |

TABLE 4

| EXAMPLE NO. | 1 | 12 | 13 | 14 |
|---|---|---|---|---|
| Zeolite | | | | |
| Type | ZSM-5 | ZSM-5 | ZSM-5 | ZSM-5 |
| Form | Na | Na | Na | Na |
| Crystal Size ($\mu$) | 2–5 | 2–5 | 2–5 | 2–5 |
| Pretreatment | | | | |
| Time, Hrs. | 10 | 10 | 10 | 10 |
| Temp, °C. | 540 | 540 | 540 | 540 |
| Atmosphere | Air | Air | Air | Air |
| NH4F Treatment | | | | |
| Wt % F | — | 2 | 4 | 6 |
| Solution | — | — | — | — |
| Status | — | — | — | — |
| Time, Hrs. | — | — | — | — |
| Temp, °F | — | — | — | — |
| Processing | | | | |
| Wash | — | Water | Water | Water |
| Dry | — | 110° C. | 110° C. | 110° C. |
| Calcine | | | | |
| Time, Hrs. | — | 10 | 10 | 10 |
| Temp, °C. | — | 540 | 540 | 540 |
| Atmosphere | — | Air | Air | Air |
| Properties | | | | |
| Surf. Area m$^2$/g | 355 | 386 | — | — |
| Sorption Wt % | | | | |
| H$_2$O | 10.2 | 7.6 | 2.5 | 1.7 |
| Cyclohexane | 3.6 | 4.2 | 2.2 | 1.2 |
| n-hexane | 11.9 | 12.8 | 11.5 | 11.0 |
| NC$_6$/cyC$_6$ ratio | 3.31 | 3.0 | 5.2 | 9.2 |
| x-ray % | 100 | — | — | — |

Properties: After NH4Cl exchange, Dried Sample, Water Wash, Dried and Calcined at 540° C. for 10 hours

| | | | | |
|---|---|---|---|---|
| Surf. Area m$^2$/g | — | 360 | 357 | 348 |
| Sorption Wt % | | | | |
| H$_2$O | — | 4.7 | 4.1 | 4.0 |
| cyclohexane | — | 2.8 | 2.4 | 2.4 |
| n-hexane | — | 12.5 | 12.2 | 12.1 |
| NC$_6$cyC$_6$ ratio | — | 4.5 | 5.1 | 5.0 |
| alpha | 583 | 278 | 213 | 173 |
| x-ray % ZSM-5 | 100 | 75 | 60 | 75 |

Additional column values for Example 14:
- Surf. Area: —
- H$_2$O: 1.1
- Cyclohexane: 1.1
- n-hexane: 10.4
- NC$_6$/cyC$_6$ ratio: 9.5
- x-ray %: —

TABLE 5
EFFECT OF VARYING NH4F CONCENTRATIONS ON LOW SODIUM ZSM-5
(Crystal Size 2–5$\mu$)

| EXAMPLE NO. | 1 | 15 | 16 | 17 |
|---|---|---|---|---|
| Zeolite | | | | |
| Type | ZSM-5 | ZSM-5 | ZSM-5 | ZSM-5 |
| Form | Low Na | Low Na | Low Na | Low Na |
| Pretreatment | | | | |
| Time, Hrs. | 10 | — | — | — |
| Temp, °C. | 540 | — | — | — |
| Atmosphere | Air | — | — | — |
| NH4F Treatment | | | | |
| Wt % F | 0 | 5 | 10 | 20 |
| Solution | — | Aqueous | Aqueous | Aqueous |
| Status | — | Pores Filled | Pores Filled | Pores Filled |
| Time, Hrs. | — | 24 | 24 | 24 |
| Temp, °C. | — | 88–93 | 88–93 | 88–93 |
| Processing | | | | |
| Wash | — | Water | Water | Water |
| Dry | — | 110° C. | 110° C. | 110° C. |
| Calcine | | | | |
| Time, Hrs. | — | 10 | 10 | 10 |
| Temp, °C. | — | 540 | 540 | 540 |
| Atmosphere | — | Air | Air | Air |
| Properties | | | | |
| Surf. Area m$^2$/g | 356 | 369 | 328 | 318 |
| Sorption Wt % | | | | |
| H$_2$O | 8.3 | 5.7 | 1.3 | 0.5 |
| Cyclohexane | 4.0 | 4.8 | 2.7 | 2.6 |
| n-hexane | 11.9 | 12.1 | 11.1 | 10.9 |
| NC$_6$/cyC$_6$ ratio | 2.98 | 2.5 | 4.1 | 4.2 |
| x-ray % ZSM-5 | 80 | 80 | 40[1] | 50[2] |
| Wt % Na | 0.004 | | 0.07 | 0.12 |

Additional column for Example 17: Surf. Area: 315; H$_2$O: 0.3; Cyclohexane: 3.1; n-hexane: 10.7; NC$_6$/cyC$_6$ ratio: 3.5; x-ray % ZSM-5: 55[3]; Wt % Na: 0.12

Properties: After NH4Cl exchange, Dried Sample, Water Wash, Dried and Calcined at 540° C. for 10 hours

| | | | | |
|---|---|---|---|---|
| Surf. Area m$^2$/g | — | — | 354 | — |
| Sorption Wt % | | | | |
| H$_2$O | — | 4.7 | 4.6 | 4.7 |
| cyclohexane | — | 4.0 | — | 3.6 |
| n-hexane | — | 11.6 | 11.4 | 11.3 |
| NC$_6$cyC$_6$ ratio | — | 2.9 | — | 3.1 |
| alpha | 436 | 210 | 202 | 203 |
| x-ray % ZSM-5 | — | 60 | 70 | 60 |

| [1]Doublets | 19 | [2]Doublets | 24.7 | [3]Doublets | 24.6 |
|---|---|---|---|---|---|
| | 24.7 | | 27 | | 26.6 |
| | 27 | | 29.5 | | 29.3 |
| | 29.4 | | | | 55.1 |
| | 48.8 | | | | |

TABLE 6

NH₄F TREATMENT OF NaZSM-5
(Crystal Size 0.02–0.05μ)
EFFECT OF PRECALCINATION CONDITIONS

| EXAMPLE NO. | 18 | 19 | 20 | 21 |
|---|---|---|---|---|
| Zeolite | | | | |
| Type | ZSM-5 | ZSM-5 | ZSM-5 | ZSM-5 |
| Form | Na | Na | Na | Na |
| Pretreatment | | | | |
| Time, Hrs. | — | 3 | 3 | 3 |
| Temp, °C. | — | 370 | 370 | 370 |
| Atmosphere | — | $N_2$ | $N_2$ | $N_2$ |
| NH₄F Treatment | | | | |
| Wt % F | — | 1 | 5 | 10 |
| Solution | — | Aqueous | Aqueous | Aqueous |
| Status | — | Pores Filled | Pores Filled | Pores Filled |
| Time, Hrs. | — | 24 | 24 | 24 |
| Temp, °C. | — | 82–93 | 82–93 | 82–93 |
| Processing | | | | |
| Wash | — | — | — | — |
| Dry | — | 110° C. | 110° C. | 110° C. |
| Calcine | | | | |
| Time, Hrs. | — | 10 | 10 | 10 |
| Temp, °C. | — | 540 | 540 | 540 |
| Atmosphere | — | Air | Air | Air |
| Properties | | | | |
| Surf. Area m²/g | — | 314 | 305 | 299 |
| Sorption Wt % | | | | |
| $H_2O$ | 5.3 | 4.4 | 3.1 | 11.3 |
| Cyclohexane | 5.3 | 5.6 | 5.4 | 10.7 |
| n-hexane | 10.5 | 11.3 | 5.3 | 10.3 |
| $NC_6/cyC_6$ ratio | 1.98 | 2.02 | 0.98 | 0.96 |
| x-ray % ZSM-5 | — | — | — | — |

NH₄F TREATMENT OF NaZSM-5 (0.02–0.05μ)
EFFECT OF PRECALCINATION CONDITIONS

| EXAMPLE NO. | 22 | 23 | 24 | 25 | 26 | 27 |
|---|---|---|---|---|---|---|
| Zeolite | | | | | | |
| Type | ZSM-5 | ZSM-5 | ZSM-5 | ZSM-5 | ZSM-5 | ZSM-5 |
| Form | Na | Na | Na | Na | Na | Na |
| Pretreatment | | | | | | |
| Time, Hrs. | 10 | 10 | 10 | 10 | 10 | 10 |
| Temp, °C. | 540 | 540 | 540 | 540 | 540 | 540 |
| Atmosphere | Air | Air | Air | Air | Air | Air |
| NH₄F Treatment | | | | | | |
| Wt % F | 1 | 5 | 10 | 2 | 5 | 10 |
| Solution | Aqueous | Aqueous | Aqueous | Aqueous | Aqueous | Aqueous |
| Status | Pores Filled | Pores Filled | Pores Filled | Pores Filled | Pores Filled | Pores Filled |
| *Time, Hrs. | 24 | 24 | 24 | 24 | 24 | 24 |
| Temp, °C. | 82–93 | 82–93 | 82–93 | 88–93 | 88–93 | 88–93 |
| Processing | | | | | | |
| Wash | — | — | — | Water | Water | Water |
| Dry | 110° C. | 110° C. | 110° C. | 110° C. | 110° C. | 110° C. |
| Calcine | | | | | | |
| Time, Hrs. | — | 10 | 10 | 10 | 10 | 10 |
| Temp, °C. | — | 540 | 540 | 540 | 540 | 540 |
| Atmosphere | — | Air | Air | Air | Air | Air |
| Properties | | | | | | |
| Surf. Area m²/g | 281 | 237 | 218 | 327 | 313 | 298 |
| Sorption Wt % | | | | | | |
| $H_2O$ | 3.3 | 2.1 | 1.4 | 2.9 | 2.8 | 2.6 |
| Cyclohexane | 5.5 | 4.1 | 3.5 | 5.6 | 5.0 | 4.2 |
| n-hexane | 9.8 | 8.6 | 8.5 | 10.8 | 10.5 | 9.8 |
| $NC_6/cyC_6$ ratio | 1.78 | 2.10 | 2.43 | 1.93 | 2.1 | 2.33 |
| x-ray % ZSM-5 | | | | 70 | 70 | 65 |
| Properties: After NH₄Cl exchange, Dried Sample, Water Wash, Dried and Calcined at 540° C. for 10 hours | | | | | | |
| Surf. Area m²/g | — | — | — | 344 | 324 | 296 |
| Sorption Wt % | | | | | | |
| $H_2O$ | — | — | — | 3.5 | 3.2 | 3.1 |
| cyclohexane | 4.6 | 2.8 | 2.0 | 5.5 | 4.6 | 4.0 |
| n-hexane | 10.5 | 9.0 | 8.7 | 10.9 | 10.0 | 9.4 |
| $NC_6cyC_6$ ratio | 2.3 | 3.2 | 4.4 | 1.98 | 2.17 | 2.35 |
| alpha | 106 | 17 | 4 | 296 | 284 | 279 |

*Approximate

TABLE 7
NH₄F TREATMENT OF ZSM-5 FOR CONTROL OF ALPHA ACTIVITY (Crystal Size 2-5μ)

| EXAMPLE NO. | 1 | 28 | 29 | 30 |
|---|---|---|---|---|
| Zeolite | | | | |
| Type | ZSM-5 | ZSM-5 | ZSM-5 | ZSM-5 |
| Form | Na | Na | Na | Na |
| Pretreatment | | | | |
| Time, Hrs. | 10 | 10 | 10 | 10 |
| Temp, °C. | 540 | 540 | 540 | 540 |
| Atmosphere | Air | Air | Air | Air |
| NH₄F Treatment | | | | |
| Wt % F | 0 | 0.5 | 1.0 | 2.0 |
| Solution | — | Aqueous | Aqueous | Aqueous |
| Status | — | Pores Filled | Pores Filled | Pores Filled |
| Time, Hrs. | — | 24 | 24 | 24 |
| Temp, °C. | — | 110 | 110 | 110 |
| Processing | | | | |
| Wash | — | — | — | — |
| Dry | — | — | — | — |
| Calcine | | | | |
| Time, Hrs. | — | 10 | 10 | 10 |
| Temp, °C. | — | 540 | 540 | 540 |
| Atmosphere | — | Air | Air | Air |
| Properties | | | | |
| Surf. Area m²/g | — | 355 | 386 | 364 | 348 |
| Sorption Wt % | | | | |
| H₂O | 10.2 | 7.6 | 6.4 | 4.0 | 2.2 |
| Cyclohexane | 3.6 | 4.2 | 3.1 | 3.2 | 2.2 |
| n-hexane | 11.9 | 12.8 | 10.8 | 10.4 | 10.0 |
| NC₆/cyC₆ ratio | 3.31 | 3.0 | 3.48 | 3.3 | 4.55 |
| x-ray % ZSM-5 | 100 | | 75 | 75 | 65[1] |

Properties: After NH₄Cl exchange, Dried Sample, Water Wash, Dried and Calcined at 540° C. for 10 hours

| | | | | |
|---|---|---|---|---|
| Surf. Area m²/g | — | 389 | 385 | 358 |
| Sorption Wt % | | | | |
| H₂O | — | 6.9 | 6.0 | 5.0 |
| cyclohexane | — | 4.7 | 4.5 | 3.2 |
| n-hexane | — | 12.5 | 12.3 | 11.7 |
| NC₆cyC₆ ratio | — | 2.7 | 2.7 | 3.7 |
| alpha | 583 | 588[2] | 452[2] | 222[2] |
| x-ray % ZSM-5 | — | 80 | 80 | 90 |

[1] Doublets at 18.1, 24.7, 27.2, 29.5
[2] Residual Sodium 0.08

TABLE 8
NH₄F TREATMENT OF COMPOSITE CATALYST ON EXTRUDATE (65% ZSM-5; 35% Al₂O₃)

| EXAMPLE NO. | 31 | 32 | 33 |
|---|---|---|---|
| Zeolite | | | |
| Type | ZSM-5 | ZSM-5 | ZSM-5 |
| Form | NH₄ | NH₄ | NH₄ |
| Pretreatment | | | |
| Time, Hrs. | 10 | 10 | 10 |
| Temp, °C. | 540 | 540 | 540 |
| Atmosphere | Air | Air | Air |
| NH₄F Treatment | | | |
| Wt % F | 0 | 2 | 10 |
| Solution | — | Aqueous | Aqueous |
| Status | — | Pores Filled | Pores Filled |
| Time, Hrs. | — | 24 | 24 |
| Temp, °C. | — | 110 | 82-93 |
| Processing | | | |
| Wash | — | — | Water |
| Dry | — | 110° C. | 110° C. |
| Calcine | | | |
| Time, Hrs. | — | 10 | 10 |
| Temp, °C. | — | 540 | 540 |
| Atmosphere | — | Air | Air |
| Properties | | | |
| Surf. Area m²/g | — | 307 | 276 |
| Sorption Wt % | | | |
| H₂O | 10.6 | 9.6 | 11.1 |
| Cyclohexane | 4.9 | 2.9 | 2.4 |
| n-hexane | 10.7 | 9.6 | 8.4 |
| NC₆/cyC₆ ratio | 2.2 | 3.3 | 3.5 |
| x-ray % ZSM-5 | 65 | 45 | 55 |
| Alpha | 286 | 63 | 10 |

Properties: After NH₄Cl exchange, Dried Sample, Water Wash, Dried and Calcined at 540° C. for 10 hours

| | | | |
|---|---|---|---|
| Surf. Area m²/g | — | — | 355 |
| Sorption Wt % | | | |
| H₂O | — | — | 15.9 |
| cyclohexane | — | — | 3.2 |
| n-hexane | — | — | 9.4 |
| NC₆cyC₆ ratio | — | — | 2.9 |
| alpha | — | — | 469 |
| x-ray % ZSM-5 | — | — | 50 |

TABLE 9
NH₄F TREATMENT OF A ZSM-35

| EXAMPLE NO. | 34 | 35 | 36 |
|---|---|---|---|
| Zeolite | | | |
| Type | ZSM-35 | ZSM-35 | ZSM-35 |
| Form | Na | Na | NH₄ |
| Pretreatment | | | |
| Time, Hrs. | 10 | 10 | 10 |
| Temp, °C. | 540 | 540 | 540 |
| Atmosphere | Air | Air | Air |
| NH₄F Treatment | | | |
| Wt % F | 0 | 5 | 2 |
| Solution | — | Aqueous | Aqueous |
| Status | — | Pores Filled | Pores Filled |
| Time, Hrs. | — | 24 | 24 |
| Temp, °C. | — | 93 | 93 |
| Processing | | | |
| Wash | — | Water | Water |
| Dry | — | 110° C. | 110° C. |
| Calcine | | | |
| Time, Hrs. | — | 10 | 10 |
| Temp, °C. | — | 540 | 540 |
| Atmosphere | — | Air | Air |
| Properties | | | |
| Surf. Area m²/g | 320 | 344 | 301 |
| Sorption Wt % | | | |
| H₂O | — | — | — |
| Cyclohexane | 4.9 | 3.4 | 2.3 |
| n-hexane | 9.4 | 8.4 | 7.3 |
| NC₆/cyc₆ ratio | 1.92 | 2.5 | 3.2 |
| x-ray % ZSM-35 | — | 105 | — |

TABLE 10
NH₄F TREATMENT OF ZSM-38

| EXAMPLE NO. | 37 | 38 | 39 |
|---|---|---|---|
| Zeolite | | | |
| Type | ZSM-38 | ZSM-38 | ZSM-38 |
| Form | Na | Na | Na |
| Pretreatment | | | |
| Time, Hrs. | — | 10 | 10 |
| Temp, °C. | — | 540 | 540 |
| Atmosphere | — | Air | Air |
| NH₄F Treatment | | | |
| Wt % F | — | 5 | 10 |
| Solution | — | Aqueous | Aqueous |
| Status | — | Pores Filled | Pores Filled |
| Time, Hrs. | — | 24 | 24 |
| Temp, °C. | — | 93 | 93 |

TABLE 10-continued

NH₄F TREATMENT OF ZSM-38

| EXAMPLE NO. | 37 | 38 | 39 |
|---|---|---|---|
| Processing | | | |
| Wash | — | Water | Water |
| Dry | — | 110° C. | 110° C. |
| Calcine | | | |
| Time, Hrs. | — | 10 | 10 |
| Temp, °C. | — | 540 | 540 |
| Atmosphere | — | Air | Air |
| Properties | | | |
| Surf. Area m²/g | 410 | 352 | 337 |
| Sorption Wt % | | | |
| H₂O | — | — | — |
| Cyclohexane | 5.3 | 4.6 | 3.2 |
| n-hexane | 8.6 | 8.7 | 8.1 |
| NC₆/cyC₆ ratio | 1.6 | 1.9 | 2.5 |
| x-ray % ZSM-38 | — | 100 | 90 |
| Properties: After NH₄Cl exchange, Dried Sample, Water Wash, Dried and Calcined Treated | | | |
| Surf. Area m²/g | — | 375 | — |
| Sorption Wt % | | | |
| H₂O | — | — | — |
| cyclohexane | — | 3.8 | — |
| n-hexane | — | 7.7 | — |
| NC₆cyC₆ ratio | — | 2.0 | — |
| alpha | — | — | — |
| x-ray % ZSM-38 | — | 100 | — |

What is claimed is:

1. A method for enhancing the selectivity for dewaxing of a porous crystalline zeolite selected from the group consisting of ZSM-5, ZSM-35, and ZSM-38 having a silica to alumina mol ratio greater than about 10 and a crystal size ranging from about 2 to 5 microns which comprises:
   (a) calcining said zeolite between the temperature of about 300° C. and about 900° C.;
   (b) impregnating said calcined zeolite at 80° to 150° C. with an aqueous solution of ammonium fluoride which yields available fluoride ions to provide between about 2.0 to about 30% by weight of elemental fluorine in the final treated product of (e);
   (c) calcining said fluoride treated zeolite at a temperature between about 300° C. and about 900° C.;
   (d) contacting said calcined, fluoride treated zeolite with an aqueous solution of an ammoniun salt; and
   (e) calcining said ammonium treated zeolite.

2. The method of claim 1 wherein said zeolite has a silica-to-alumina ratio greater than about 100.

3. The method of claim 1 wherein zeolite has a silica-to-alumina ratio greater than about 500.

4. The method of claim 1 wherein the ammonium salt of (d) is selected from the group consisting of ammonium chloride, ammonium sulfate, ammonium chloride and mixtures thereof.

5. The method of claim 4 wherein the concentration of ammonium salt in the resultant treated zeolite composition is the equivalent of between about 0.1 and about 30% by weight of elemental fluorine.

6. The method of claim 1 wherein subsequent to step (b) and prior to step (c) said zeolite is water washed.

7. The method of claim 1 wherein said zeolite is ZSM-5.

8. The method of claim 1 wherein said impregnating said calcined zeolite of (b) is effected at a temperature between about 82° and about 150° C.

9. A method for enhancing the selectivity for dewaxing of a crystalline zeolite having a silica-to-alumina mol ratio greater than 10, a crystal size ranging from about 2 to 5 microns and selected from the group consisting of ZSM-5, ZSM-35, and ZSM-38, which method comprises:
   contacting said zeolite with an amount of aqueous solution of ammonium fluoride, said amount containing sufficient salt to provide between about 2.0 to about 30 percent by weight of said zeolite of fluorine, said contacting being for a time and at a temperature effective to enhance said selectivity; and;
   calcining said contacted zeolite at a temperature of about 300° C. to 900° C.

10. The method of claim 9 wherein said zeolite is free of alumina binder.

11. The method of claim 9 including the step of calcining said zeolite at about 540° C. in a gs containing elemental oxygen prior to said contacting step.

12. The method of claim 9 wherein said contacting is effected by impregnation.

13. The method of claim 11 wherein said contacting is effected by impregnation.

14. The method of claim 9 including the step of water washing said contacted zeolite prior to said calcining step.

15. The method of claim 11 including the step of water washing said contacted zeolite prior to the step of calcining at 300° C. to 900° C. said contacted zeolite.

16. The method of claim 9 including the step of converting said calcined zeolite to the hydrogen form.

17. The method of claim 11 including the step of converting said twice-calcined zeolite to the hydrogen form.

18. The product formed by the method of claim 10 and having an alpha value of at least about 100.

19. The product formed by the method of claim 11 and having an alpha value of at least about 100.

20. The product formed by the method of claim 12 and having an alpha value of at least about 100.

21. The product formed by the method of claim 13 and having an alpha value of at least about 100.

22. The product formed by the method of claim 14 and having an alpha value of at least about 100.

23. The product formed by the method of claim 15 and having an alpha value of at least about 100.

24. The product formed by the method of claim 16 and having an alpha value of at least about 100.

25. The product formed by the method of claim 17 and having an alpha value of at least about 100.

* * * * *

UNITED STATES PATENT AND TRADEMARK OFFICE
CERTIFICATE OF CORRECTION

PATENT NO. : 4,678,766

DATED : July 7, 1987

INVENTOR(S) : Edward J. Rosinski

It is certified that error appears in the above-identified patent and that said Letters Patent is hereby corrected as shown below:

Col. 5, line 25, "reistance" should be --resistance--.

Col. 7, line 64, "treatement" should be --treatment--.

Col. 7, line 68, "fluoride presence" should be --fluoride. Presence--.

Col. 8, line 49, "demonstrte" should be --demonstrate--.

Col. 18, claim 11, line 27, "gs" should be --gas--.

Signed and Sealed this

Twenty-ninth Day of December, 1987

Attest:

DONALD J. QUIGG

Attesting Officer

Commissioner of Patents and Trademarks